(12) United States Patent
Hey et al.

(10) Patent No.: US 7,934,171 B2
(45) Date of Patent: Apr. 26, 2011

(54) METHOD, DEVICE AND COMPUTER PROGRAM PRODUCT FOR PROVIDING USER INFORMATION WITHIN A GRAPHICAL USER INTERFACE

(75) Inventors: Uwe Hey, Nürnberg (DE); Markus Weinländer, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 435 days.

(21) Appl. No.: 11/417,816

(22) Filed: May 4, 2006

(65) Prior Publication Data

US 2006/0256084 A1 Nov. 16, 2006

(30) Foreign Application Priority Data

May 10, 2005 (EP) .................................... 05010170

(51) Int. Cl.
*G06F 3/048* (2006.01)
(52) U.S. Cl. ...................... 715/856; 715/763; 715/769
(58) Field of Classification Search .................. 715/856, 715/762, 763, 769
See application file for complete search history.

(56) References Cited

U.S. PATENT DOCUMENTS

| 5,546,521 A | 8/1996 | Martinez |
| 5,777,616 A | 7/1998 | Bates et al. |
| 6,437,800 B1 * | 8/2002 | Malamud et al. ............. 715/711 |
| 6,587,995 B1 * | 7/2003 | Duboc et al. .................. 716/106 |
| 7,010,773 B1 * | 3/2006 | Bartz et al. ..................... 716/121 |
| 7,219,306 B2 * | 5/2007 | Kodosky et al. .............. 715/763 |
| 2004/0031019 A1 * | 2/2004 | Lamanna et al. .............. 717/125 |
| 2004/0199828 A1 * | 10/2004 | Cabezas et al. ................ 714/39 |
| 2005/0256785 A1 * | 11/2005 | Entwistle et al. ............... 705/27 |
| 2007/0219842 A1 * | 9/2007 | Bansal et al. ..................... 705/9 |

FOREIGN PATENT DOCUMENTS

EP 0 528 597 A2 2/1993

OTHER PUBLICATIONS

Mitrovic et al., "Contraint-Based Tutors: A Success Story", Intelligent Computer Tutoring Group, Department of Computer Science, University of Cantebury, 2001, pp. 931-940, XP 007912677, Springer-Verlag Berlin Heidelberg.

* cited by examiner

*Primary Examiner* — Weilun Lo
*Assistant Examiner* — Shashi K Becker

(57) ABSTRACT

The invention relates to a method, a computer program product and a device for providing user information relating to a screen object selected by a user with a pointer tool within a graphical user interface. In order to provide the most comprehensive assistance possible to a user when operating the pointer tool, the following method steps are proposed:
detecting the selected screen object,
continuously registering the position of the selected screen object within the graphical user interface while the screen object is being moved by the user by means of the pointer tool,
displaying a window which follows the position of the selected screen object and contains text-based information which is dependent on the position of the selected screen object.

9 Claims, 3 Drawing Sheets

METHOD, DEVICE AND COMPUTER PROGRAM PRODUCT FOR PROVIDING USER INFORMATION WITHIN A GRAPHICAL USER INTERFACE

CROSS REFERENCE TO RELATED APPLICATIONS

This application claims priority to the European Application No. EP05010170.8, filed May 10, 2005 which is incorporated by reference herein in its entirety.

FIELD OF INVENTION

The invention relates to a method, a device and a computer program product for providing user information relating to a screen object selected by a user with a pointer tool within a graphical user interface. The invention is used in particular when the selected screen object is moved with the aid of the pointer tool.

BACKGROUND OF INVENTION

Most computer programs today feature a graphical user interface (GUI) within which a user can perform control operations within the computer program with the aid of a pointer tool, e.g. a mouse pointer. A typical example of an interaction of this type between a user and a computer program is what is referred to as "drag'n'drop". In this action the user first selects an object on the screen by pointing to said object with the mouse and pressing a corresponding mouse button. The user keeps the mouse button depressed and moves the mouse pointer together with the selected object over the graphical user interface into another area of the screen. During this process it is indicated to the user by a suitable visualization means that he or she can drag the object to this other screen area. When the user releases the mouse button, the screen object is "dropped" onto the other screen area.

SUMMARY OF INVENTION

Depending on the screen area into which the user would like to drag the selected object, it can happen that the drop operation is not allowed. An example of this is a file management system, such as Windows Explorer, in which a user attempts to drag a file onto a write-protected or full data medium. If it is detected by the file management system that the user is planning an illegal action of this kind, this is generally indicated by the application program by means of a modified visualization of the mouse pointer. Typically a prohibited sign is placed next to the mouse pointer on the graphical user interface.

In particular in complex engineering systems, there is a great risk that a user will want to perform an illegal drag'n'drop action. An example of such an illegal drag'n'drop action by a user is the attempt to copy a control program object from a PLC controller onto an HMI panel using drag'n'drop. This is not permitted due to the technical characteristics of the devices.

An object underlying the invention is to provide the most comprehensive assistance possible to a user of a graphical user interface when operating a pointer tool.

This object is achieved by a method for providing user information relating to a screen object selected by a user by means of a pointer tool within a graphical user interface, comprising the following method steps:
  detecting the selected screen object,
    continuously registering the position of the selected screen object within the graphical user interface while the screen object is being moved by the user by means of the pointer tool,
  displaying a window which follows the position of the selected screen object and contains text-based information which is dependent on the position of the selected screen object.

This object is also achieved by means of a computer program product for performing the above-cited method.

The object is achieved in addition by means of a device for providing user information relating to a screen object selected by a user by means of a pointer tool within a graphical user interface, comprising:
  detection means for detecting the selected screen object,
    recording means for continuously registering the position of the selected screen object within the graphical user interface while the screen object is being moved by the user by means of the pointer tool,
  display means for displaying a window which follows the position of the selected screen object and contains text-based information which is dependent on the position of the selected screen object.

Pointer tool, in this context, should be understood to mean screen elements which can be moved directly by the user within the user interface with the aid of a technical device. A typical example of a pointer tool of this kind is a mouse pointer which the user can move over the user interface with the aid of an electronic mouse. Alternatively such a pointer or pointer tool can also be moved with the aid of a touchpad or trackball, to name just a couple of examples.

According to the invention a further window is displayed in addition to the pointer tool, said window automatically following the position of the pointer tool when the latter is moved by the user. Within the window, information which is dependent on the position of the selected screen object, and therefore dependent on the position of the pointer tool within the graphical user interface, is displayed in text form for the user. In this way the user constantly receives up-to-date information relating to the context of the current position of the selected screen object when moving the selected object over the screen with the aid of the pointer tool. Because this information is displayed in text form, there is very great flexibility in the provision of the information. Since the position of the window is linked to the position of the pointer tool, the information displayed within the window is always in the current focus of the user. This approach is in contrast to what are referred to as tool tips, which usually pop up at one position and remain there irrespective of the position of the pointer tool moved by the user.

In an advantageous embodiment of the method according to the invention the text-based information contains indications concerning the legality of a drag'n'drop operation performed by the user by means of the pointer tool. If, for example, the user attempts to copy a file within a file management system such as Windows Explorer by drag'n'drop from one data medium to another data medium when the other data medium is write-protected, a corresponding piece of information will be displayed in text form within the window notifying the user of this illegal action even while the drag'n'drop operation is being attempted. Within the window linked to the pointer tool the information is displayed, for example, that the destination folder residing on the other data medium is a write-protected folder. In this way the user is not only informed of the illegality of the planned drag'n'drop operation even while the selected screen object is being moved over the user interface. Rather, the user is immediately notified of the reason for the illegality of the planned operation. Output information that is differentiated in this manner permits the use of drag'n'drop operations also in very much more complex applications than file management systems.

The window is advantageously displayed semi-transparently. By this means the screen information which is located beneath the window linked to the pointer tool can continue to be made out by the user.

In an advantageous embodiment of the invention, the window is displayed during a move or copy action within a file management system. In this case it is possible, thanks to the text-based form of the information within the window, to furnish the user with very much more differentiated information about his/her planned move or copy actions than is provided today by the mere displaying of a prohibited sign linked to the pointer tool.

Particularly beneficial is an implementation of the method for providing the user information within an engineering system for the automation engineering sector. In complex computer program products of this kind, the learning curve for the program can be considerably improved by the text-based information layout within the window linked to the pointer tool. Moreover, the invention enables a higher level of working efficiency, since the cause of a problem which would arise during an illegal move or copy action planned by the user with the aid of the pointer tool is immediately displayed to him/her. As a result of the text-based information display within the window during a drag'n'drop operation the user does not have to search for a matching problem description subsequently in a help function or similar.

BRIEF DESCRIPTION OF THE DRAWINGS

The invention is described and explained in more detail below with reference to the exemplary embodiments shown in the figures, in which.

DETAILED DESCRIPTION OF INVENTION

Figure 1:
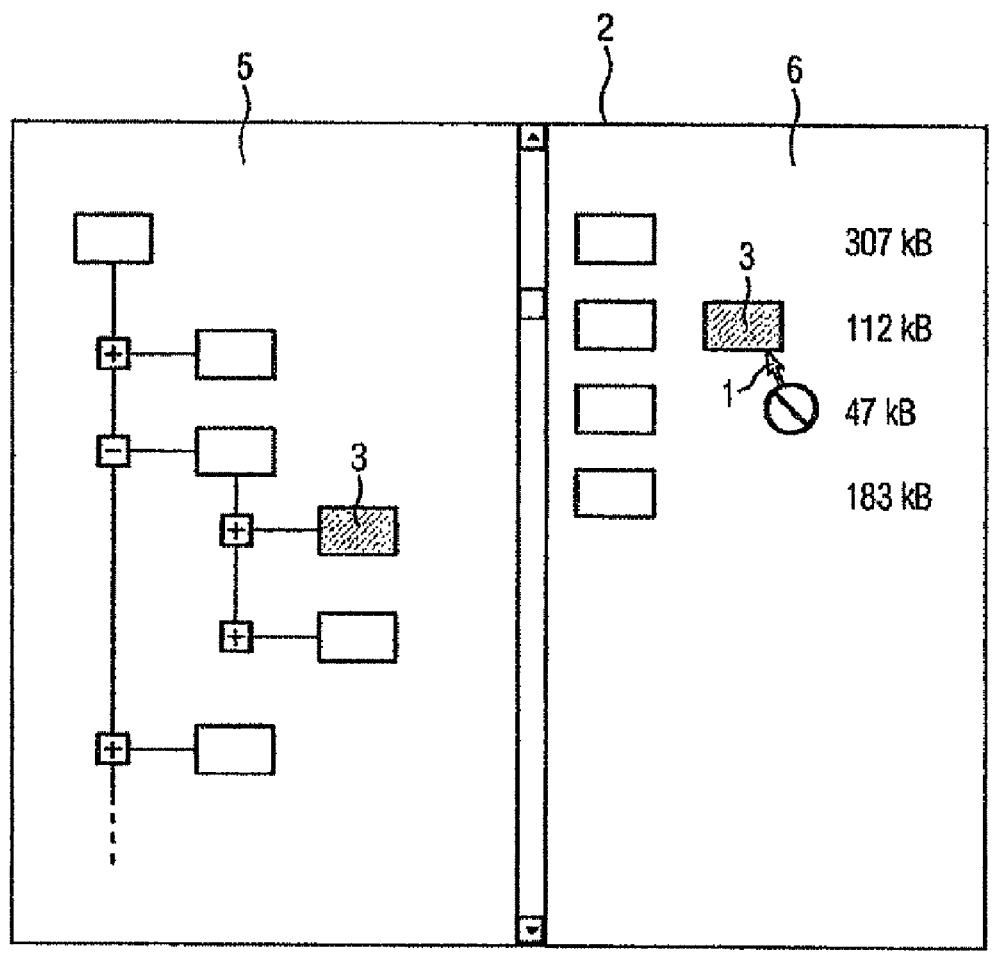
FIG. 1 shows a drag'n'drop action of a user in a file management system according to the prior art

FIG. 1 shows a drag'n'drop action of a user in a file management system according to the prior art. The file management system has a graphical user interface 2 which comprises a first area 5 and a second area 6. Within the first area 5 is shown a hierarchical directory structure in the form of a tree. The second area 6, on the other hand, shows the elements of a hierarchy level of the directory structure. In the "drag'n'drop" action shown, the user has initially marked (selected) a screen object 3, a file of the file management system, within the first area 5 with the aid of a mouse pointer 1 by moving the mouse pointer 1 onto the file 3 and pressing the left mouse button. Next, while keeping the left mouse button pressed, the user moves the mouse pointer 1 into the second area 6 in order to move the selected file 3 into the corresponding directory level. However, this action is detected by the system as illegal, as indicated by the display of a prohibited sign 7 under the mouse pointer 1. The user does not, however, receive any indications as to why his/her planned drag'n'drop action is not allowed.

Figure 2:
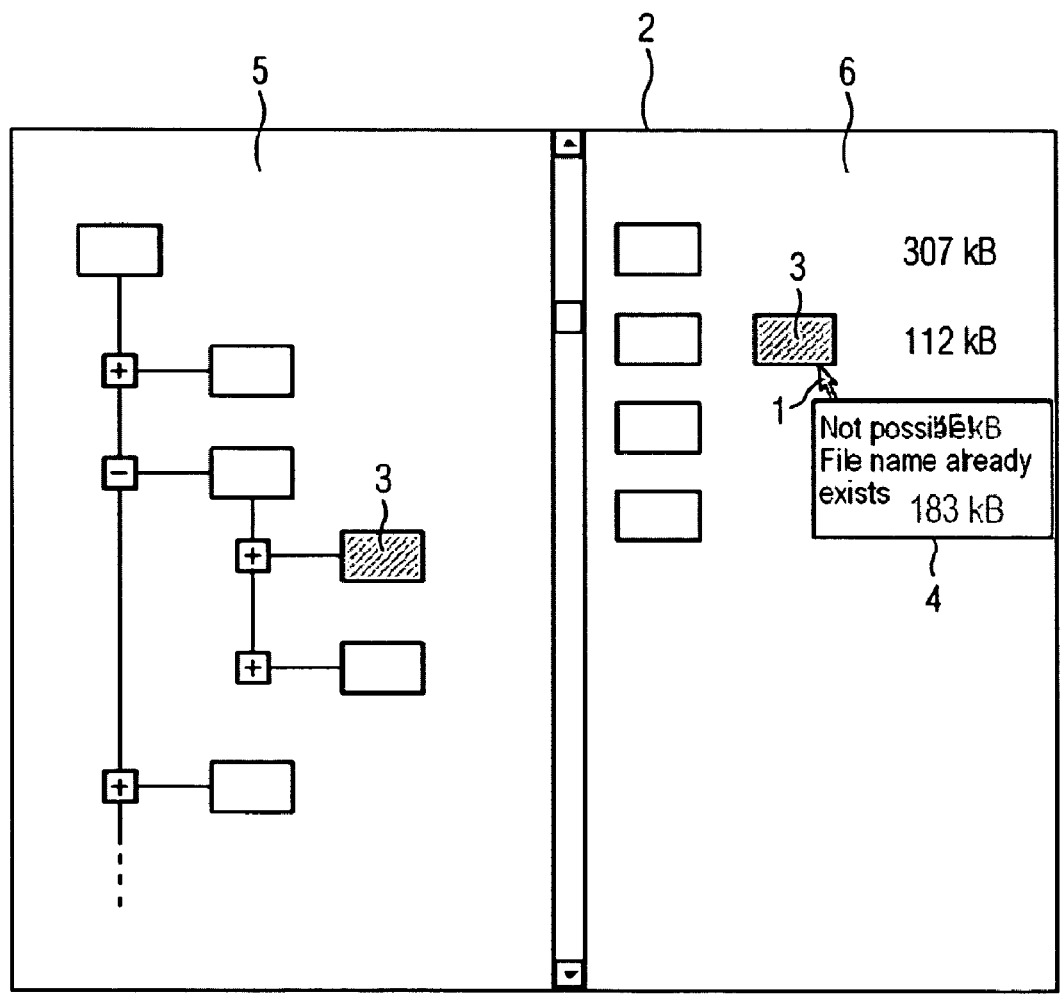
FIG. 2 shows a drag'n'drop action of a user in a file management system according to an embodiment of the invention

FIG. 2 shows a drag'n'drop action of a user in a file management system according to an embodiment of the invention. In this figure the same reference numerals as in FIG. 1 are used for the same elements. In the case depicted here, too, the user attempts to move the selected screen object 3, which in this case also designates a file of a hierarchical file structure, into another folder. As in FIG. 1, it is also assumed here that the drag'n'drop action shown is not allowed. In this case, however, as soon as the user moves the selected file 3 from the first area 5 into the second area 6 with the aid of the mouse pointer 1, a window 4 is displayed under the mouse pointer 1 indicating to the user why his/her planned drag'n'drop action is not possible. In this case a message pops up in the window 4 telling the user that the file name already exists. Thus, the user of the file management system is informed directly as to why the copy or move action is illegal, without having to search through manuals or similar help resources for this information. The position of the window 4 is tightly linked to the mouse pointer 1, with the result that the window or its content is always in the focus of the user. Furthermore, the window 4 is displayed semi-transparently, so screen elements which are positioned behind the window 4 continue to be discernible. In the case illustrated, the screen elements concerned specify the size of the folders displayed within the second area.

Figure 3:
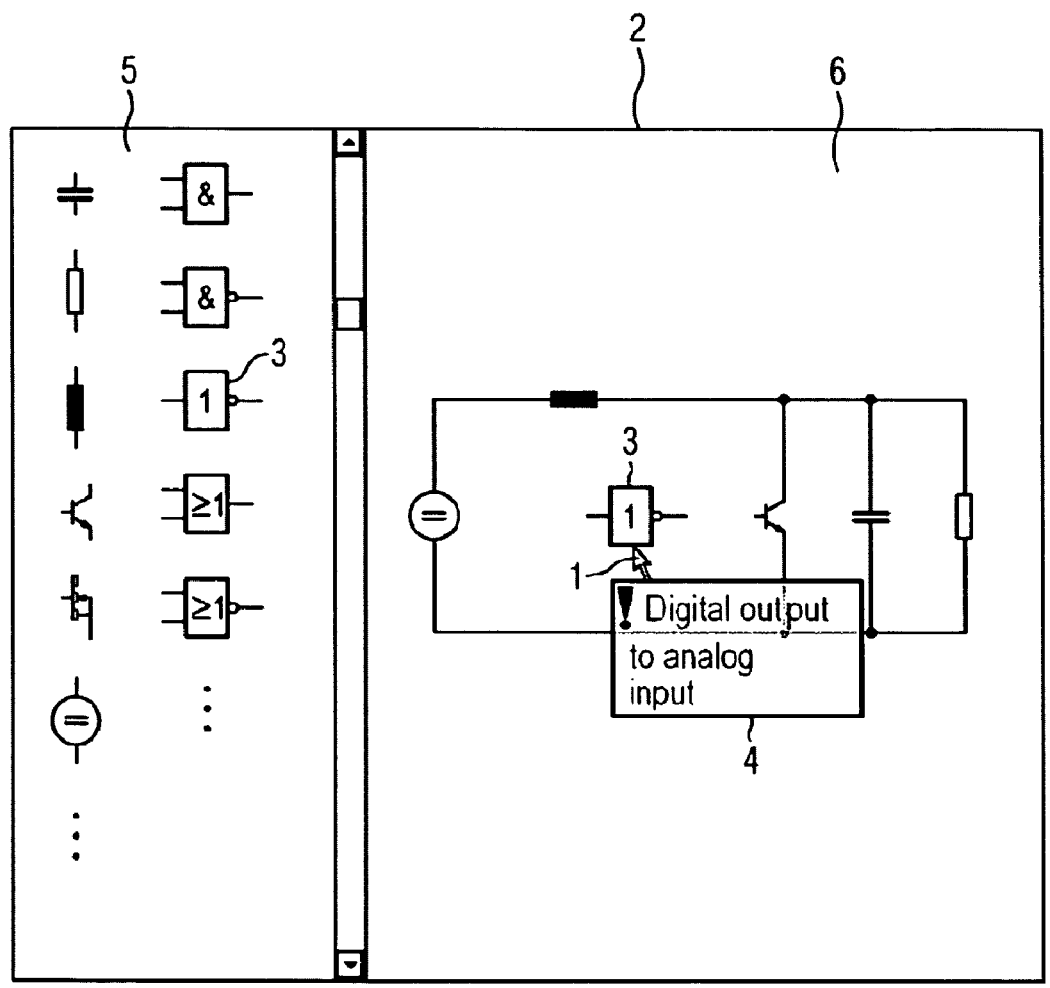
FIG. 3 shows a drag'n'drop action of a user in an engineering system according to a further embodiment of the invention

FIG. 3 shows a drag'n'drop action of a user in an engineering system according to a further embodiment of the invention. Once again, the engineering system depicted also has a graphical user interface 2 which is subdivided into a first area 5 and a second area 6. With the aid of the engineering system shown, electrical, electronic and logic circuits can be designed, simulated and transferred to a real-time system. A user of a system of this kind can build such a circuit within the second area 6 by copying the corresponding elements from the first area 5 into the second area 6 and wiring them together within the second area. For this purpose, with the aid of a pointer tool 1, which is in particular a mouse pointer, the user can select an element of the first area 5 and drag it into the second area 6 using drag'n'drop. With this embodiment of the invention a check is now made during such a drag'n'drop action to determine whether this is useful or, as the case may be, allowed in the context of the application. In the case shown the user has built a power electronics circuit, a so-called buck converter, from the elements of the first area 5. In order to complete the circuit the user would additionally like to design a drive circuit for the transistor shown.

Within the first area 5 the user has at his/her disposal electrical, electronic and logic components. In this example the user uses the mouse pointer 1 to select a screen element 3 embodied as an inverter and attempts to connect it directly to the base input of the transistor. As soon as the user moves the inverter 3 in immediate proximity to the transistor with the aid of the mouse pointer 1, a window 4 opens beneath the mouse pointer 1; in this window it is explained to the user that he or she is planning to connect a digital output to an analog input. In this way the user is already made aware of a possible error in the design of such an electronic circuit before he or she has completed it. This represents a decisive advantage over today's standard engineering systems and circuit simulation programs in which wiring errors of this kind are detected only with the aid of subsequent results or in a compilation phase.

In the exemplary embodiment shown, the window 4 with the user message is displayed semi-transparently, so the elements of the electronic circuit lying behind the window 4 continue to remain visible.

The invention claimed is:

1. A method of providing in an engineering system user information related to a screen object selected by a user using a pointer tool within a graphical user interface, the method comprising:
   detecting the selected screen object in a first screen area comprising a plurality of graphical representations of at least one of an electrical, an electronic and/or a logic circuit component;
   continuously registering a position of the selected screen object within the graphical user interface while the screen object is being moved by the user via the pointer tool;
   displaying a movable window following the registered position of the selected screen object, the movable window having text-based information based on the registered position of the selected screen object, wherein the text-based information indicates if a drag-and-drop operation intended by the user via the pointer tool is permissible for the selected screen object, and, in the event the intended drag-and-drop operation is impermissible, the text-based information further indicates at least a reason for the impermissible drag-and-drop operation;
   in the event the intended drag-and-drop operation is permissible, dragging the selected screen object to a second screen area comprising a graphical representation of a circuit being designed that includes at least one of an electrical, an electronic and/or a logic circuit component;
   graphically coupling an interface port of the selected screen object to an interface port of said at least one of the electrical, the electronic and/or the logic circuit component of the circuit being designed; and
   indicating in the text-based information at least one incompatibility occurring between the selected screen object and said at least one of the electrical, the electronic and/or the logic circuit component of the circuit being designed;
   wherein the displaying of the movable window having the text-based information with said at least one incompatibility is arranged so that the user is aware of said at least one incompatibility prior to constructing a physical embodiment of the circuit, and is further arranged so that the user is aware of said at least one incompatibility without having to run a subsequent simulation of the circuit for detecting said at least one incompatibility.

2. The method as claimed in claim 1, wherein the movable window is semi-transparent.

3. The method as claimed in claim 1, wherein the graphical user interface includes a file management system, and the movable window is displayed during a move or copy operation performed by the user within the file management system.

4. The method as claimed in claim 1, wherein the graphical user interface is a graphical user interface of an engineering system for planning automation systems.

5. An article of manufacture comprising a computer program medium having a computer program stored on the medium, the program when executed by a computer for an engineering system allows to provide user information related to a screen object selected by a user using a pointer tool within a graphical user interface, the computer program having software modules configured to:
   detect the selected screen object in a first screen area comprising a plurality of graphical representations of at least one of an electrical, an electronic and/or a logic circuit component;
   continuously register a position of the selected screen object within the graphical user interface while the screen object is being moved by the user via the pointer tool;
   display a movable window following the registered position of the selected screen object, the movable window having text-based information based on the registered position of the selected screen object, wherein the text-based information indicates if a drag-and-drop operation intended by the user via the pointer tool is permissible for the selected screen object, and, in the event the intended drag-and-drop operation is impermissible, the text-based information further indicates at least a reason for the impermissible drag-and-drop operation;
   in the event the intended drag-and-drop operation is permissible, drag the selected screen object to a second screen area comprising a graphical representation of a circuit being designed that includes at least one of an electrical, an electronic and/or a logic circuit component;
   graphically couple an interface port of the selected screen object to an interface port of said at least one of the electrical, the electronic and/or the logic circuit component of the circuit being designed; and
   indicate in the text-based information functional at least one incompatibility occurring between the selected screen object and said at least one of the electrical, the electronic and/or the logic circuit component of the circuit being designed,
   wherein the display of the movable window having the text-based information with said at least one incompatibility is arranged so that the user is aware of said least one incompatibility prior to constructing a physical embodiment of the circuit, and is further arranged so that the user is aware of said at least one incompatibility without having to run a subsequent simulation of the circuit for detecting said at least one incompatibility.

6. A device for providing user information related to a screen object selected by a user using a pointer tool within a graphical user interface, the device comprising:
   a detection unit for detecting the selected screen object in a first screen area comprising a plurality of graphical representations of at least one of an electrical, an electronic and/or a logic circuit component;
   a recording unit for continuously registering a position of the selected screen object within the graphical user interface while the screen object is being moved by the user via the pointer tool;
   a display for displaying a movable window following the registered position of the selected screen object, the movable window having text-based information based on the registered position of the selected screen object, wherein the text-based information indicates if a drag-and-drop operation intended by the user via the pointer tool is permissible for the selected screen object, and, in the event the intended drag-and-drop operation is impermissible, the text-based information further indicates at least a reason for the impermissible drag-and-drop operation, wherein, in the event the intended drag-and-drop operation is permissible, the selected screen object is dragged to a second screen area comprising a graphical representation of a circuit being designed that includes at least one of an electrical, an electronic and/or a logic circuit component, wherein an interface port of the selected screen object is graphically coupled to an interface port of said at least one of the electrical, the electronic and/or the logic circuit components of the circuit being designed, wherein the text-based information is configured to indicate at least one incompatibility occurring between the selected screen object and said at least one of the electrical, the electronic and/or the logic circuit components of the circuit being designed, wherein the display of the movable window having the text-based information with said at least one incompatibility is arranged so that the user is aware of said least one incompatibility prior to constructing a physical embodiment of the circuit, and is further arranged so that the user is aware of said at least one incompatibility without having to run a subsequent simulation of the circuit for detecting said at least one incompatibility.

7. The device as claimed in claim 6, wherein the movable window is displayed semi-transparently.

8. The device as claimed in claim 6, wherein the graphical user interface includes a file management system, and the movable window is displayed during a move or copy operation performed by the user within the file management system.

9. The device as claimed in claim 6, wherein the graphical user interface is a graphical user interface of an engineering system for planning automation systems.

\* \* \* \* \*